(12) United States Patent
Bass

(10) Patent No.: US 7,559,217 B2
(45) Date of Patent: Jul. 14, 2009

(54) METHOD AND SYSTEM FOR OFFERING DEBT RECOVERY PRODUCTS TO A CUSTOMER

(75) Inventor: Scott Bass, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 1909 days.

(21) Appl. No.: 09/812,831

(22) Filed: Mar. 21, 2001

(65) Prior Publication Data

US 2002/0138409 A1    Sep. 26, 2002

(51) Int. Cl.
*G06Q 40/00* (2006.01)
(52) U.S. Cl. .................. 70/40; 705/1; 705/30; 705/34; 705/35; 705/38; 235/379
(58) Field of Classification Search .................. 705/40, 705/1, 30, 34, 35, 38; 235/379
See application file for complete search history.

(56) References Cited

U.S. PATENT DOCUMENTS

| 6,014,645 | A  | * | 1/2000  | Cunningham ................. 705/38 |
| 6,098,052 | A  | * | 8/2000  | Kosiba et al. ................. 705/40 |
| 6,298,335 | B1 |   | 10/2001 | Bernstein ..................... 705/40 |
| 6,532,450 | B1 | * | 3/2003  | Brown et al. .................. 705/40 |
| 7,191,150 | B1 | * | 3/2007  | Shao et al. .................... 705/38 |
| 7,318,046 | B1 | * | 1/2008  | Wellons et al. ................ 705/38 |
| 2002/0059139 | A1 |  | 5/2002  | Evans .......................... 705/40 |
| 2002/0077972 | A1 |  | 6/2002  | Wilwerding et al. .......... 705/39 |
| 2002/0116245 | A1 | * | 8/2002 | Hinkle et al. ................... 705/8 |
| 2002/0123946 | A1 | * | 9/2002 | Haworth et al. ............... 705/35 |
| 2003/0033245 | A1 |  | 2/2003  | Kahr |

OTHER PUBLICATIONS

International Search Report dated Feb. 25, 2003 for PCT/US02/08428.
Piumelli, Frederick A., "Automating Collections", *Business Credit*, New York, Feb. 2001.
Hill Jr., Sidney, "Are Online Collections for Real?", *Collections and Credit Risk*, New York, Jul. 1999.

\* cited by examiner

*Primary Examiner*—Daniel S Felten
(74) *Attorney, Agent, or Firm*—Finnegan, Henderson, Farabow, Garrett & Dunner L.L.P.

(57) ABSTRACT

Methods and systems for offering debt recovery products to customers having delinquent accounts are disclosed. A debt recovery service retrieves delinquent account information corresponding to a customer. Based on the retrieved delinquent account information, the debt recovery service determines a set of debt recovery offers for the customer. The customer sends customer selection information to the debt recovery service. Customer selection information customizes a debt recovery product that corresponds to one of the set of debt recovery offers. The debt recovery service then creates a debt recovery account for the customized debt recovery product.

16 Claims, 6 Drawing Sheets

METHOD AND SYSTEM FOR OFFERING DEBT RECOVERY PRODUCTS TO A CUSTOMER

FIELD OF THE INVENTION

The present invention generally relates to the field of debt recovery. More particularly, the invention relates to a method and system for a debt recovery service to offer a set of debt recovery products to a customer in debt.

BACKGROUND AND MATERIAL INFORMATION

Credit issuing businesses of all sizes and types sometimes have problems with customers who are delinquent in paying off debt. Non-payment of debt, such as credit card debt, has cost businesses billions of dollars in revenue. Most credit issuers do not merely wait for delinquent customers to pay their debt. Instead, to recover all or a portion of the debt, they usually employ various tactics to collect payments from their customers.

Many credit issuers initially make an effort to collect overdue payments using some type of reminder, such as a letter or a phone call. Initial efforts are usually non-confrontational in case there has been a misunderstanding, such as the customer erroneously believing that all debt was previously paid or the credit issuer not receiving payments that actually were sent by the customer. A credit issuer often will receive payments from some customers in response to such a reminder. However, for other customers, the reminder will not be sufficient and their debts will remain unpaid.

Accounts that remain overdue for a lengthy period of time may be designated as a charged-off account. A charged-off account is an account on which a customer has not made a payment for a predetermined time period. Credit issuers consider charged-off accounts "written off" from their books (e.g., no longer receivable). Credit issuers may continue to attempt collection on charged-off accounts, but customers may no longer use the account to create further debt.

If initial collection efforts fail, some credit issuers resort to using debt collection agencies to collect payments from delinquent customers. For example, a credit issuer may give a number of charged off accounts to an agency, while retaining ownership of the accounts. When customers provide payments to the agency, the agency keeps a percentage (e.g., 50%) and forwards the remainder to the credit issuer. Credit issuers may also try selling a portfolio of charged off accounts to an agency. Under this arrangement, agencies essentially buy portfolios for a fraction of the debt amount (e.g., less than one cent per dollar) and attempt collection. Accordingly, a customer then owes the debt collecting agency instead of the original credit issuing business. However, the practice of buying portfolios of charged-off debt may not be very attractive to the purchasing agency. Some businesses believe the practice is high risk because there is a good chance that the customer will not pay. One possible reason for a customer's non-willingness to pay is use of a repayment plan that is unattractive to the customer. Moreover, other repayment plans may be unattractive to the business, not making it worth the risk of buying charged-off accounts and other debt.

Accordingly, there is a need for an improved method and system for offering debt recovery products to customers. There is also presently a need for a method and system for making the sale or purchase of debt more acceptable to businesses, so that debt can be more quickly recovered at less risk to businesses.

SUMMARY OF THE INVENTION

Methods and systems consistent with the principles of the invention offer debt recovery products to customers having delinquent accounts. A debt recovery service retrieves delinquent account information corresponding to a customer. Based on the retrieved delinquent account information, the debt recovery service determines a set of debt recovery offers for the customer (such as a debt recovery credit card offer, installment loan offer, and/or a quick repayment offer). The customer sends customer selection information to the debt recovery service. Customer selection information customizes a debt recovery product that corresponds to one of the set of debt recovery offers. Thereafter, the debt recovery service creates a debt recovery account for the customized debt recovery product.

A system consistent with the principles of the invention also offers debt recovery products to customers having delinquent accounts. An account database stores delinquent account information for a plurality of delinquent accounts. An offer decision model determines a set of debt recovery offers (such as a debt recovery credit card offer, installment loan offer, and/or a quick repayment offer) for a customer based on delinquent account information, retrieved from the database, that corresponds to the customer. After the set of debt recovery offers has been considered by the customer, a server receives customer selection information from the customer. Customer selection information customizes a debt recovery product corresponding to one of the set of debt recovery offers. Thereafter, a fulfillment engine creates a debt recovery account for the customized debt recovery product.

Another method consistent with the principles of the invention also offers debt recovery products to customers having delinquent accounts. A debt recovery service acquires a portfolio of delinquent accounts from a business entity that owns the portfolio. The debt recovery service then notifies one or more customers corresponding to the portfolio of delinquent accounts to contact the debt recovery service. When a notified customer contacts the debt recovery service, the service retrieves delinquent account information corresponding to the notified customer. Based on the retrieved delinquent account information, the debt recovery service determines a set of debt recovery offers for the notified customer (such as a debt recovery credit card offer, installment loan offer, and/or a quick repayment offer). The notified customer sends customer selection information to the debt recovery service, after considering the set of debt recovery offers. Customer selection information customizes a debt recovery product that corresponds to one of the set of debt recovery offers. Thereafter, the debt recovery service creates a debt recovery account for the customized debt recovery product.

BRIEF DESCRIPTION OF THE DRAWINGS

The accompanying drawings are incorporated in and constitute a part of this specification and, together with the description, explain the features and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Methods and systems consistent with the principles of the invention enable debt recovery services to offer a plurality of debt recovery products to customers. A debt recovery service acquires a portfolio of delinquent accounts from a business entity that owns the portfolio. The debt recovery service then notifies one or more customers corresponding to the portfolio of delinquent accounts to contact the debt recovery service. When a notified customer contacts the debt recovery service, the service retrieves delinquent account information corresponding to the notified customer. Delinquent account information may include, for example, the customer's name, social security number, address, phone number, amount of charged-off debt, last payment date/amount, type of debt (e.g., credit card, medical bill, loan, etc.), previous payment history, credit bureau history, or any other information related to the customer's debt. Based on the retrieved delinquent account information, the debt recovery service determines a set of debt recovery offers for the notified customer (such as a debt recovery credit card offer, installment loan offer, and/or a quick repayment offer). The notified customer sends customer selection information to the debt recovery service, after considering the set of debt recovery offers. Customer selection information customizes a debt recovery product that corresponds to one of the set of debt recovery offers and varies dependent on the debt recovery offer that is accepted by the customer. Thereafter, the debt recovery service creates a debt recovery account for the debt recovery product.

Figure 1:
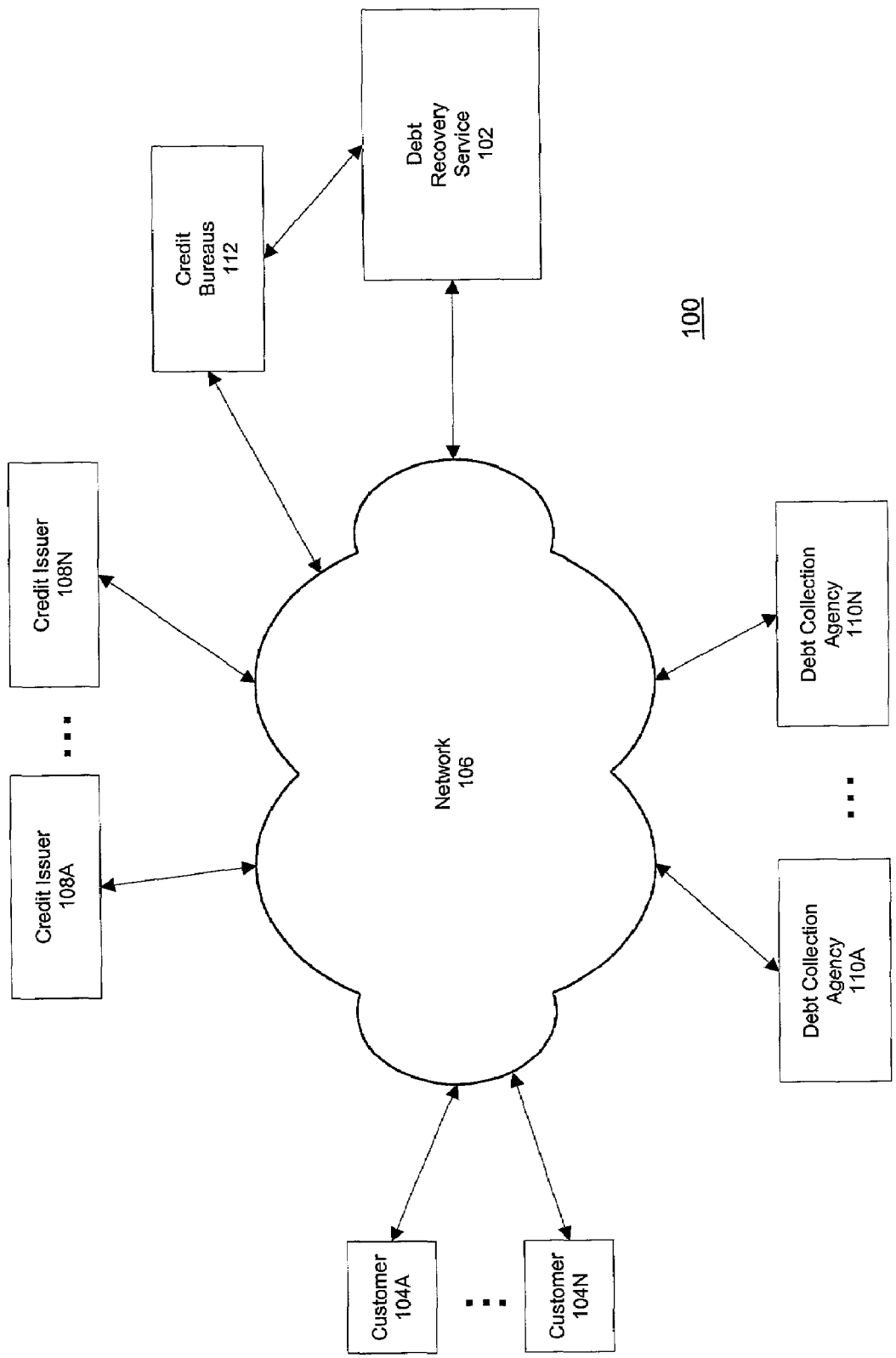
FIG. 1 is a diagram of an exemplary network environment in which the features and aspects of the present invention may be implemented.

FIG. 1 is a diagram of an exemplary network environment 100 in which the features and aspects of the present invention may be implemented. Network environment 100 includes debt recovery service 102, customers 104A through 104N, network 106, credit issuers 108A through 108N, debt collection agencies 110A through 110N, and credit bureaus 112. The components of FIG. 1 may be implemented through hardware, software, and/or firmware. The number of components in network environment 100 is not limited to what is shown.

Debt recovery service 102 may be a business that seeks companies that own delinquent accounts, for the purpose of paying for and attempting to collect payments on the delinquent accounts. Delinquent accounts may correspond to accounts which have been designated as charged-off. Charged-off accounts are those accounts on which customers have not made payments for a specified period of time. Companies vary as to the length of the time period before an account becomes charged-off, but the period is usually at least several months. Some companies set the time period at six months. Once an account is charged-off, that account is no longer considered a receivable account, and the customer is not permitted to accumulate any further debt on that account.

When debt recovery service 102 successfully purchases or otherwise acquires an interest in a portfolio of delinquent accounts from a company, such as credit issuer 108A or debt collection agency 110A, it proceeds to make efforts to collect payments on those delinquent accounts. For example, debt recovery service 102 may assign to a delinquent account a set of debt recovery offers, based on the account's characteristics. A customer corresponding to the delinquent account may select one of the offers and customize the selected offer to the customer's liking. The customer then pays off his or her debt by making payments on a debt recovery product account corresponding to the selected offer.

Customers 104A-104N correspond to customers who have an account that is delinquent. Each customer that selects and customizes a debt recovery offer can do so by communicating with debt recovery service 102 via an appropriate communication channel, for example, network 106 (which may comprise a wired or wireless communication network, including the Internet). Alternatively, customers may select and customize a debt recovery product offer using a telephone (not shown), electronic mail, regular mail (not shown), or by physically going to a customer center (not shown) operated by debt recovery service 102.

Credit issuers 108A-108N are companies that are the original issuers of credit. Credit issuers 108A-108N own portfolios of delinquent (i.e., charged-off) accounts and have agreed to sell or otherwise give an interest in at least one portfolio to debt recovery service 102. Such an interest, for example, may arise when a credit issuer receives a commission for delinquent accounts from debt recovery service 102, instead of selling the delinquent accounts outright. Also, a credit issuer and debt recovery service 102 could agree to share payments received on delinquent accounts, without any kind of account purchase. Debt collection agencies 110A-110N operate in a similar manner to credit issuers 108A-108N, except they are not the original issuers of credit. Debt collection agencies 110A-110N are companies that have either bought delinquent accounts from another company, or agreed to collect payments on delinquent accounts on behalf of another company (e.g., according to some kind of payment sharing arrangement).

Credit bureaus 112 are organizations that provide credit information. These organizations include, for example, Equifax, Experian, and Trans-Union. Credit bureaus 112 generally collect credit information and make it available to businesses that subscribe to their services. When a customer selects and customizes a debt recovery offer, credit bureaus 112 may receive a report from debt recovery service 102 indicating that the customer's previous debt is settled. Credit bureaus 112 may also receive an indication from debt recovery service 102 that a new trade line should be opened for the debt recovery product. A trade line is credit information maintained for a particular customer, with respect to a line of credit for a particular company.

Figure 2:
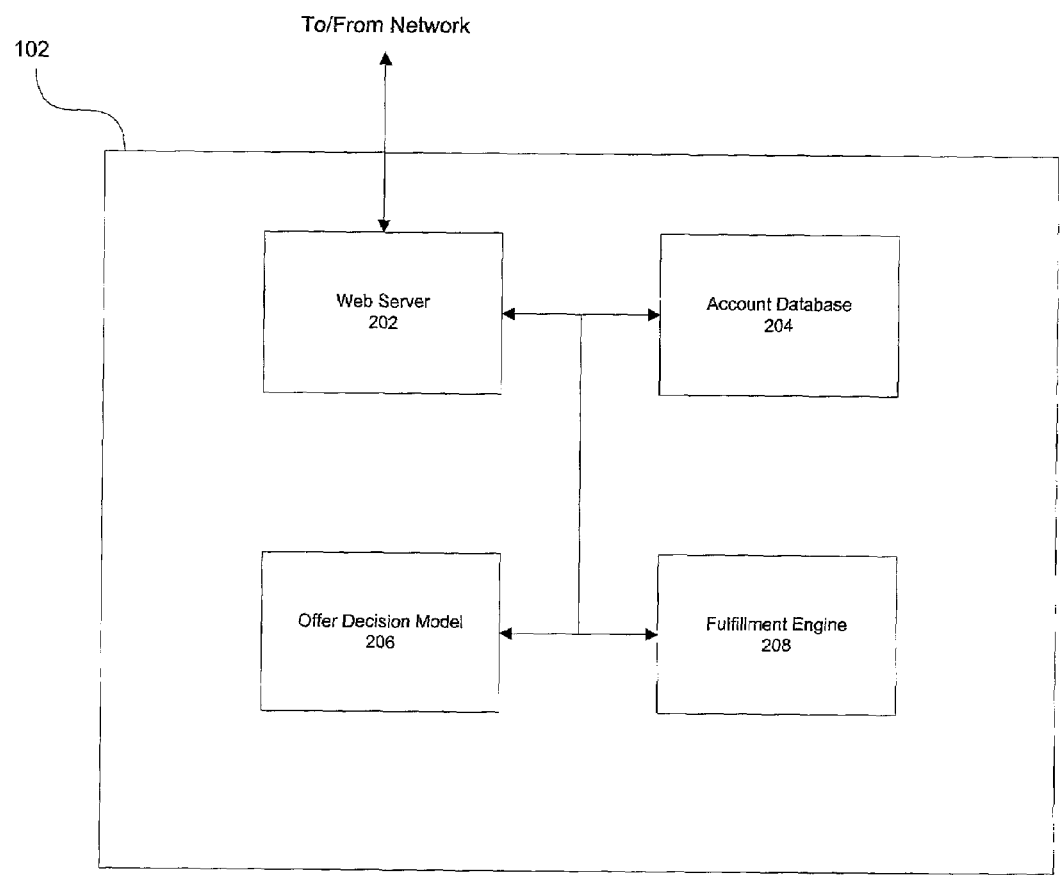
FIG. 2 is an exemplary diagram of a debt recovery service consistent with the present invention.

FIG. 2 is an exemplary diagram of the main system components for implementing debt recovery service 102, consistent with the principles of the invention. Debt recovery service 102 comprises web server 202, account database 204, offer decision model 206, and fulfillment engine 208. Web server 202 connects debt recovery service 102 to a network (such as network 106 of FIG. 1). A customer may log on to a web page located at web server 202 after receiving a notification from debt recovery service 102 that a delinquent account associated with the customer is now controlled by debt recovery service 102. Web server 202 routes a customer login/account number from the customer to account database 204, where delinquent account information corresponding to the login/account number may be retrieved. Web server 202 also routes offer information to customers and forwards customer selection information from customers to fulfillment engine 208.

Account database 204 stores delinquent account information pertaining to each customer whose account is part of a portfolio of delinquent accounts managed by debt recovery service 102. Delinquent account information may include, for example, the customer's name, social security number, address, phone number, amount of charged-off debt, last payment date/amount, type of debt (e.g., credit card, medical bill, loan, etc.), previous payment history, credit bureau history, or any other information related to the customer's debt.

Delinquent account information retrieved from account database 204 may be input to offer decision model 206, where a set of debt recovery offers appropriate for the delinquent account are determined based on the delinquent account information and other data. The debt recovery offers may be for a variety of debt recovery products, such as a debt recovery credit card product, an installment loan, and a quick repayment product (debt recovery offers may also correspond to other debt recovery products not specifically listed here). The set of offers may be sent to a customer via web server 202.

Debt recovery products give customers the opportunity to pay off their debts under terms agreed to with the debt recovery service 102. For example, customers agreeing to a debt recovery credit card offer receive a credit card with a particular credit limit and balance. The balance is set to an amount less than or equal to the balance owed on a delinquent account. Each customer then pays off his or her debt by making payments on the debt recovery credit card account. Customers agreeing to an installment loan offer enter into an agreement where debt is repaid to the debt recovery service in a number of successive payments over some number of months. Customers agreeing to a quick repayment offer enter into an agreement where debt is repaid to the debt recovery service in a small number of successive payments over a relatively short period of time. For example, a customer may enter into an agreement for a quick repayment, where the customer makes three equal payments to the debt recovery service in six weeks.

Fulfillment engine 208 receives customer selection information from customers via web server 202 and creates a debt recovery account in accordance with this information. Debt recovery account information may be stored, for example, in account database 204. Debt recovery account information varies dependent on the type of debt recovery product that corresponds to the relevant account. For example, for a debt recovery credit card, the debt recovery account information may include, among other things, balance data, credit limit data, open to buy (OTB) data (e.g., available balance), along with the customer selection information.

Figure 3:
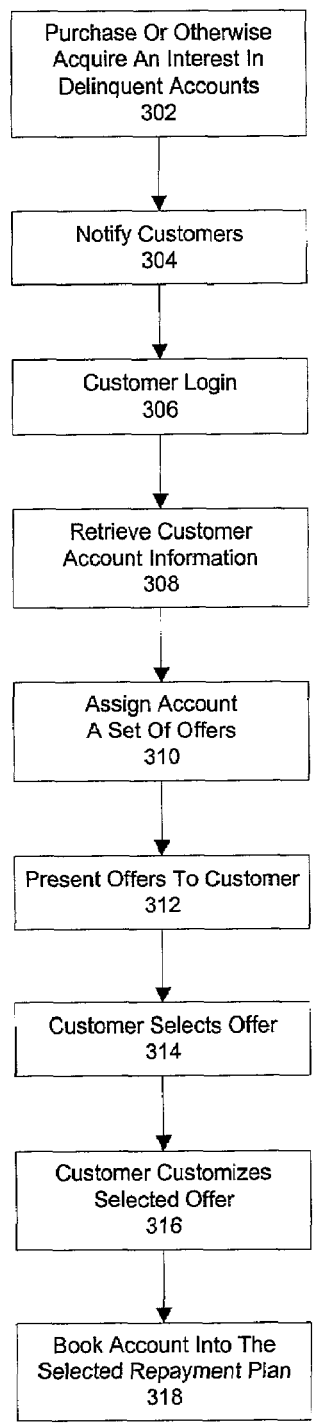
FIG. 3 is an exemplary flowchart of a method for offering a set of debt recovery products in a manner consistent with the present invention.

FIG. 3 is an exemplary flowchart for offering a set of debt recovery products in a manner consistent with the present invention. Debt recovery service 102 first purchases or otherwise acquires an interest in one or more portfolios of delinquent accounts (e.g., charged-off accounts) from various business entities that it identifies (Step 302). The business entity can be the original issuer of credit, such as a credit card company, bank, hospital, or other organization that initially extended a line of credit to a customer (e.g., credit issuers 108A-108N). Alternatively, the business entity can be a debt collection agency that bought a portfolio of delinquent accounts from the original issuer of credit or from another debt collection agency (e.g., debt collection agencies 110A-110N). Debt recovery service 102 may also themselves be the original issuer of credit. In that case, debt recovery service 102 may control a number of delinquent accounts without first having to purchase or otherwise acquire them.

Once debt recovery service 102 has control over the delinquent accounts, it sends the customers corresponding to those delinquent accounts a notification that debt recovery service 102 control their accounts (Step 304). This notification may be sent to a customer in a variety of manners, including, for example, regular mail, telephone, electronic mail, or a web page. The notification also provides the customer with a customer login/account number, and instructs the customer to contact debt recovery service 102 to receive a set of offers for debt recovery products. A customer may contact debt recovery service 102 by accessing a web page located at debt recovery service 102 using a web browser program. The web page may be implemented with a hypertext markup language (HTML) file that is resident at debt recovery service 102. The web page prompts the customer to enter his or her customer login/account number (Step 306). Alternatively, the customer may contact debt recovery service 102 using a telephone, electronic mail, regular mail, or by physically going to a customer center operated by debt recovery service 102.

Upon receiving the customer login/account number, web server 202 located at debt recovery service 102 forwards the number to an account database, such as account database 204 in FIG. 2. The customer login/account number is used as the basis of a query to the account database to retrieve delinquent account information corresponding to the customer (Step 308). Delinquent account information may include, for example, the customer's name, social security number, address, phone number, amount of charged-off debt, last payment date/amount, type of debt (e.g., credit card, medical bill, loan, etc.), previous payment history, credit bureau history, or any other information related to the customer's debt. Debt recovery service 102 may also access external information sources as an additional way of learning about the customer. For example, debt recovery service 102 may contact credit bureaus 112, credit issuers 108A-108N, or debt collection agencies 110A-110N, to gather further information on the customer's payment history, credit bureau history, etc. Alternatively, that information may be included as part of the delinquent account information stored in the account database.

Offer decision model 206 receives all of the retrieved delinquent account information (including external information, if any) and proceeds to assign the customer a set of debt recovery offers based on that information (Step 310). The debt recovery offers may be for a variety of debt recovery products, such as a debt recovery credit card product, an installment loan, and a quick repayment product. Offer decision model 206 assigns offers based on what would be most profitable for debt recovery service 102 and what would be most acceptable to the customer.

For example, offer decision model 206 may be more likely to offer a customer a debt recovery credit card than other debt recovery products, if that customer has been attempting to get a new credit card but has been unsuccessful. Other factors that may weigh in favor of offering a debt recovery credit card include, for example, the time of year being the holiday season, a high delinquent balance (e.g., it would be difficult to pay a high balance quickly), or the delinquent account being based on credit card debt (e.g., a customer that previously had a credit card probably would accept another one). Also, if a customer has a history of many credit cards that were open for a short time, or if the customer lives in an area that has a high rate of customers with credit cards, offer decision model 206 may be more likely to offer a debt recovery credit card than other debt recovery products.

Offer decision model 206 may be more likely to offer an installment loan, for example, if it determines that the customer has previously had installment loans, or if the customer lives in an area that has a high rate of customers with installment loans. Offer decision model 206 may be more likely to offer a quick repayment, for example, if the time of year is around tax time, if the customer's credit is relatively clean except for this one delinquent account, if the offer decision model predicts that the customer has a high propensity to pay, or if the customer has a history of paying off debts through settlements or payment in full.

The aforementioned factors used in determining which debt recovery products are offered may be part of a set of rules utilized by offer decision model 206. For example, debt recovery service 102 may decide on a set of rules based on its business objectives and store these rules where they can be accessed by offer decision model 206. A sample rule may be to offer a debt recovery credit card when it is the holiday season and the customer has a history of having many credit cards.

After deciding on a set of debt recovery offers, offer decision model 206 outputs the to web server 202. The set of offers may include an offer for each type of debt recovery product (e.g., some customers may be offered a debt recovery credit card, installment loan, and quick repayment). Alternatively, the set of offers may omit an offer for one or more type of debt recovery product (e.g., some customers may be offered only a debt recovery credit card, etc.). Web server 202 may present the set of offers to the relevant customer using a web page resident on the server (Step 312). Alternatively, the set of offers may be routed to the customer using regular mail, electronic mail, or the telephone. In one embodiment, when there is more than one offer in the set, the offers are ranked according to how profitable the offers are to the debt recovery service, and presented to the customer in ranked order. The offers may also be ranked and presented according to how likely the customer may accept a given offer. Alternatively, the offers may be presented in an unranked order.

After being presented with the set of offers, the customer selects one of the offers, for example, by clicking on a web page with a mouse (Step 314). The customer may then customize the selected offer (Step 316). For example, each debt recovery offer is associated with a number of different options. The customer may select from these options to customize a debt recovery product to his or her liking. Offer customization is more fully explained below with reference to FIGS. 4-6.

Once the customer has customized the debt recovery offer, the customer submits customer selection information describing the customized offer, for example, by clicking on a web page with a mouse. Web server 202 receives the customer selection information and forwards it to fulfillment engine 208, which proceeds to create a debt recovery account based on the received information (Step 318).

Figure 4:
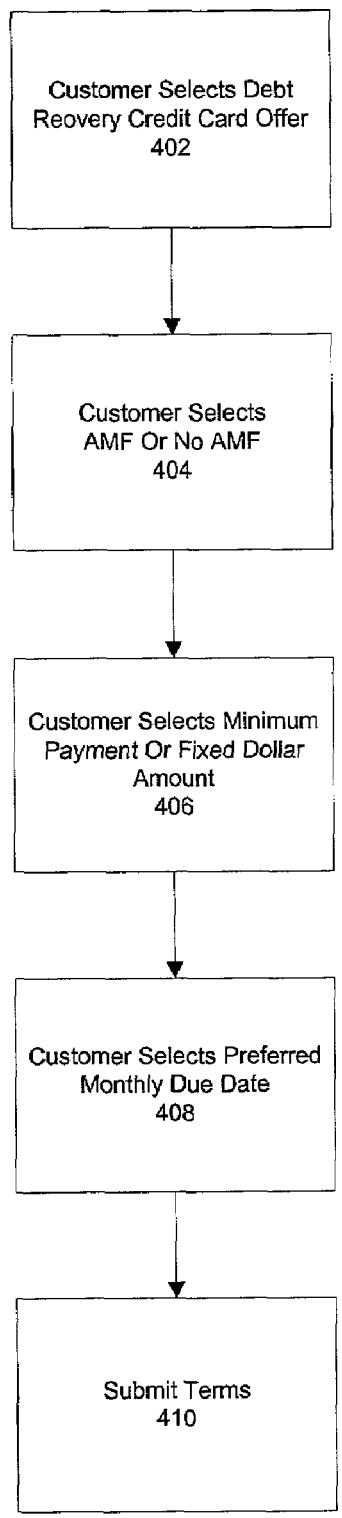
FIG. 4 is an exemplary flowchart of a method for selecting and customizing a debt recovery credit card offer in a manner consistent with the present invention.

FIG. 4 is an exemplary flowchart of a method for selecting and customizing a debt recovery credit card offer in a manner consistent with the present invention. First, a customer that has been presented with one or more debt recovery offers, including a debt recovery credit card offer, selects the debt recovery credit card offer (Step 402). A customer that decides to accept the offer may do so by responding, for example, through a web page, regular mail, telephone, electronic mail, or by physically going to a customer center operated by debt recovery service 102. After selecting the debt recovery credit card offer, debt recovery service 102 presents the customer with several options from which to choose in order to customize the debt recovery credit card. One option relates to an annual membership fee (AMF). Debt recovery service 102 prompts the customer to choose whether he or she would prefer to have an AMF or no AMF (Step 404). The debt recovery service informs the customer that the credit card's annual percentage rate (APR) varies dependent on the choice. For example, the APR for a debt recovery credit card is higher with no AMF is selected, than the APR for a card with an AMF selected.

Another option relates to the payment amount due on the credit card each month. Debt recovery service 102 prompts the customer to select a minimum payment or fixed dollar amount due monthly (Step 406). For example, debt recovery service 102 may present a list of minimum payment percentages from which the customer may choose. A minimum payment percentage refers to a percentage of the outstanding balance that constitutes the minimum payment in a given month (e.g., if a customer selects a minimum payment percentage of 5%, then the customer owes 5% of the outstanding balance each month). Debt recovery service 102 presents the list of percentages based on the balance due at the time the list is presented. A higher balance results in lower percentage options, and a lower balance results in higher percentage options.

Debt recovery service 102 may also present the customer with a list of fixed dollar amounts. A fixed dollar amount refers to a specific payment due each month. A customer that chooses a fixed dollar amount instead of a minimum payment percentage pays the selected dollar amount each month instead of a percentage of the outstanding balance. Debt recovery service 102 may determine the fixed dollar amount based on the amount of debt. For example, a range of fixed dollar amounts may be higher for a high balance debt than a range of fixed dollar amounts for a lower balance debt. Debt recovery service 102 typically determines a list of fixed dollar amounts so that the lowest fixed dollar amount in the list results in payments close to those that result from the lowest minimum payment percentage. In addition to presenting the customer with a list of fixed dollar amounts, debt recovery service 102 may present the customer with an indication of how fast debt would be paid off for each fixed dollar amount in the list.

Debt recovery service 102 may incorporate a discount into the total debt owed, if it determines that the customers may have a low propensity to pay off debt. For example, debt recovery service 102 may reduce a $2,000 debt to $1,600, if offer decision model 206 determines that the customer has a long history of not paying off other debts. A customer with a discounted debt may be more likely to satisfy the debt.

The customer may also select a preferred monthly payment due date (Step 408). For example, the customer may designate any day of a month to have payments due. All of the selection information chosen by the customer (e.g., AMF option, minimum payment percentage/fixed dollar amount, monthly payment due date) may be entered, for example, on a web page of debt recovery service 102. Alternatively, the customer may supply selection information to debt recovery service 102 using regular mail, electronic mail, telephone, or by physically going to a customer center operated by debt recovery service 102. Note that although steps 404-408 are shown in a particular order, these steps may occur in any order.

After the customer has selected from the various options, the customer indicates that the credit card terms have been chosen. For example, the customer may click on an OK button displayed on a web page. Clicking on the button submits the various selected credit card terms (e.g., customer selection information) to fulfillment engine 206 via web server 202 (Step 410). Fulfillment engine 206 proceeds to create a debt recovery credit card account that has the selected terms or has terms as close to the selected terms as possible. Account database 204 stores information on the debt recovery credit card account. Once the account has been created, debt recovery service 102 also sends a report to credit bureaus 120 indicating that the customer's previous debt is now settled and instructs credit bureaus 120 to open a new trade line for the customer's newly issued debt recovery credit card.

Figure 5:
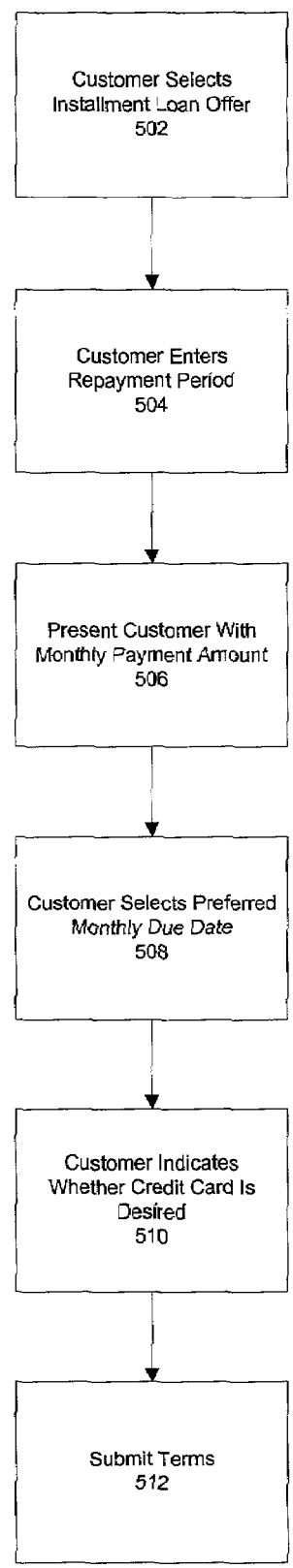
FIG. 5 is an exemplary flowchart of a method for selecting and customizing an installment loan offer in a manner consistent with the present invention.

FIG. 5 is an exemplary flowchart of a method for selecting and customizing an installment loan offer in a manner consistent with the present invention. First, a customer that has been presented with one or more debt recovery offers, including an installment loan offer, selects the installment loan offer (Step 502). A customer that decides to accept the offer may do so by responding, for example, through a web page, regular mail, telephone, electronic mail, or by physically going to a customer center operated by debt recovery service 102. After selecting the installment loan offer, debt recovery service 102 presents the customer with several options from which to choose in order to customize the installment loan.

Debt recovery service 102 also prompts the customer to choose a repayment period (Step 504). For example, the customer may choose a number of months over which the customer desires to repay debt via installment loan payments. Based on the repayment period chosen by the customer and the amount of debt owed, debt recovery service 102 determines a monthly payment amount and presents it to the customer (Step 506).

Debt recovery service 102 may incorporate a discount into the total debt owed, if it determines that the customers may have a low propensity to pay off debt. For example, debt recovery service 102 may reduce a $2,000 debt to $1,600, if offer decision model 206 determines that the customer has a long history of not paying off other debts. A customer with a discounted debt may be more likely to satisfy the debt.

The customer may also select a preferred monthly payment due date (Step 508). For example, the customer may designate any day of a month to have payments due. Debt recovery service 102 may also choose to offer the customer a credit card that may be conditionally used by the customer. This credit card is associated with the installment loan offer and requires that a customer's installment loan payments be up to date for use. Upon being presented with the offer for the credit card, the customer may indicate whether the credit card is desired (Step 510).

All of the selection information chosen by the customer (e.g., repayment period, monthly payment due date, additional credit card) may be entered, for example, on a web page of debt recovery service 102. Alternatively, the customer may supply selection information to debt recovery service 102 using regular mail, electronic mail, telephone, or by physically going to a customer center operated by debt recovery service 102.

After the customer has selected from the various options, the customer indicates that the installment loan terms have been chosen. For example, the customer may click on an OK button displayed on a web page. Clicking on the button submits the various selected installment loan terms (e.g., customer selection information) to fulfillment engine 206 via web server 202 (Step 512). Fulfillment engine 206 proceeds to create an installment loan account that has the selected terms or has terms as close to the selected terms as possible. Account database 204 stores information on the installment loan account. Once the account has been created, debt recovery service 102 also sends a report to credit bureaus 120 indicating that the customer's previous debt is now settled and instructs credit bureaus 120 to open a new trade line for the customer's newly issued debt recovery credit card.

Figure 6:
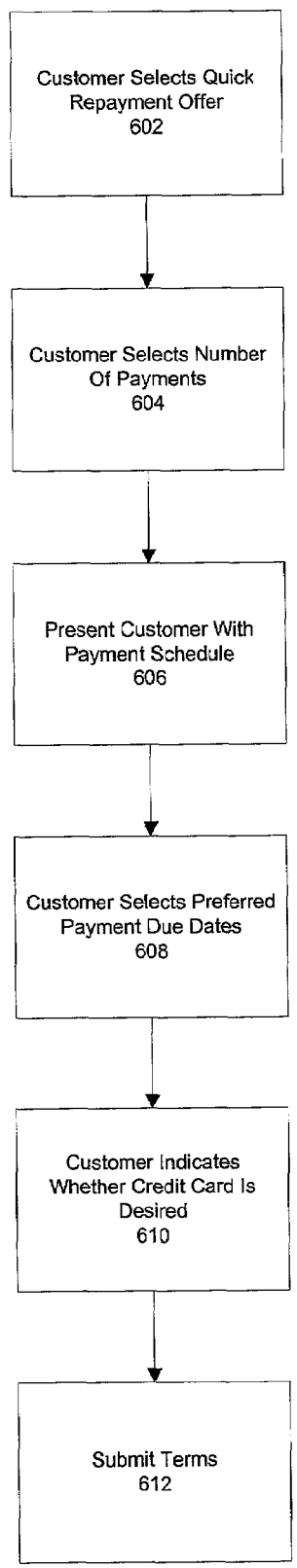
FIG. 6 is an exemplary flowchart of a method for selecting and customizing a quick repayment offer in a manner consistent with the present invention.

FIG. 6 is an exemplary flowchart of a method for selecting and customizing a quick repayment offer in a manner consistent with the present invention. First, a customer that has been presented with one or more debt recovery offers, including a quick repayment offer, selects the quick repayment offer (Step 602). A customer that decides to accept the offer may do so by responding, for example, through a web page, regular mail, telephone, electronic mail, or by physically going to a customer center operated by debt recovery service 102. After selecting the quick repayment offer, debt recovery service 102 presents the customer with several options from which to choose in order to customize the quick repayment.

Debt recovery service 102 prompts the customer to select a number of payments (Step 604). For example, the customer may select a small number of payments over which the debt is paid off. Debt recovery service 102 may set a maximum number of payments from which the customer selects. Based on the number of payments selected by the customer and the amount of debt owed, debt recovery service 102 determines a payment schedule and presents it to the customer (Step 606). For example, a customer that owes $1,500 and chooses to repay the debt in three payments may be presented with a payment schedule of three payments of $500 each. Debt recovery service 102 may also present the customer with payment schedules that incorporate possible discounts. The debt recovery service may determine possible discounts based on a prediction of the customer's propensity to pay and based on how much the customer is willing to pay in a given payment. For example, debt recovery service 102 may offer the customer a large discount, if the customer is determined to have a high propensity to pay and is willing to make one or two large payments to satisfy the debt.

The customer may also select preferred payment due dates (Step 608). For example, the customer may designate the specific days on which payments are due. Debt recovery service 102 may require that the payments be made within a predetermined time period. Debt recovery service 102 may also choose to offer the customer a credit card that may be conditionally used by the customer. This credit card is associated with the quick repayment offer and requires that a customer has made all agreed upon payments for use. Upon being presented with the offer for the credit card, the customer may indicate whether the credit card is desired (Step 610).

All of the selection information chosen by the customer (e.g., number of payments, preferred due dates, additional credit card) may be entered, for example, on a web page of debt recovery service 102. Alternatively, the customer may supply selection information to debt recovery service 102 using regular mail, electronic mail, telephone, or by physically going to a customer center operated by debt recovery service 102.

After the customer has selected from the various options, the customer indicates that the quick repayment terms have been chosen. For example, the customer may click on an OK button displayed on a web page. Clicking on the button submits the various selected quick repayment terms (e.g., customer selection information) to fulfillment engine 206 via web server 202 (Step 612). Fulfillment engine 206 proceeds to create a quick repayment account that has the selected terms or has terms as close to the selected terms as possible. Account database 204 stores information on the quick repayment account. Note that for quick repayment accounts, debt recovery service 102 does not send a report to credit bureaus 112 indicating that the previous debt is settled, and does not instruct credit bureaus 112 to open a new trade line.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. The invention, therefore is not limited to the disclosure herein, but is intended to cover any adaptations or variations thereof.

What is claimed is:

1. A method, implemented using a computer, for offering debt recovery products to customers having delinquent accounts, the method comprising:
   retrieving, using the computer, delinquent account information corresponding to a delinquent account for a customer, the delinquent account having a balance;
   determining, using the computer, a set of debt recovery offers for the customer based on the delinquent account information, the set of debt recovery offers including a debt recovery credit card product;
   ranking, using the computer, the debt recovery offers of the set of debt recovery offers when there is more than one debt recovery offer in the set;
   receiving, using the computer, customer selection information from the customer, the customer selection information customizing a debt recovery product corresponding to one of the set of debt recovery offers; and
   creating, using the computer, a debt recovery account for the customized debt recovery product,
   wherein when the debt recovery product is the debt recovery credit card product, the debt recovery account is a credit card account with an initial balance based on the delinquent account balance.

2. The method of claim 1, said retrieving comprising:
   receiving an account number from the customer; and
   reading delinquent account information corresponding to the account number from an account database.

3. The method of claim 1, further comprising:
   storing debt recovery account information in an account database.

4. The method of claim 1, wherein the set of debt recovery offers includes at least one of a debt recovery credit card offer, an installment loan offer, and a quick repayment offer.

5. The method of claim 1, wherein the set of debt recovery offers includes a debt recovery credit card offer, an installment loan offer, and a quick repayment offer.

6. The method of claim 1, wherein the customer selection information comprises a preferred payment due date.

7. The method of claim 1, wherein the customer selection information comprises a repayment period.

8. The method of claim 1, wherein the customer selection information comprises a number of repayments.

9. The method of claim 1, wherein the customer selection information comprises a minimum payment percentage.

10. The method of claim 1, wherein the customer selection information comprises a fixed dollar amount.

11. The method of claim 1, wherein the customer selection information comprises an indication as to whether an annual membership fee is desired by the customer.

12. The method of claim 1, wherein the delinquent account information includes at least one of amount of delinquent debt, last payment date, last payment amount, type of debt, previous payment history, and credit bureau history.

13. The method of claim 1, wherein the delinquent accounts are charged-off accounts.

14. An apparatus for offering debt recovery products to customers having delinquent accounts, the apparatus comprising:
   an account database that stores delinquent account information corresponding to a delinquent account for a customer, the delinquent account having a balance;
   an offer decision model that determines a set of debt recovery offers for a customer based on delinquent account information that corresponds to the customer, the set of debt recovery offers including a debt recovery credit card product, and ranks the debt recovery offers of the set of debt recovery offers when there is more than one debt recovery offer in the set;
   a server that receives customer selection information from the customer, the customer selection information customizing a debt recovery product corresponding to one of the set of debt recovery offers; and
   a fulfillment engine that creates a debt recovery account for the customized debt recovery product,
   wherein when the debt recovery product is the debt recovery credit card product, the debt recovery account is a credit card account with an initial balance based on the delinquent account balance.

15. An apparatus for offering debt recovery products to customers having delinquent accounts, the apparatus comprising:
   means for retrieving delinquent account information corresponding to a delinquent account for a customer, the delinquent account having a balance;
   means for determining a set of debt recovery offers for the customer based on the delinquent account information, the set of debt recovery offers including at least one debt recovery credit card product;
   means for ranking the debt recovery offers of the set of debt recovery offers when there is more than one debt recovery offer in the set;
   means for receiving customer selection information from the customer, the customer selection information customizing a debt recovery product corresponding to one of the set of debt recovery offers;
   means for creating a debt recovery account for the customized debt recovery product, and
   a storage device for storing data relating to the debt recovery account on a computer-readable medium,
   wherein when the debt recovery product is the debt recovery credit card product, the debt recovery account is a credit card account with an initial balance based on the delinquent account balance.

16. A method, implemented using a computer, for offering debt recovery products to customers having delinquent accounts, the method comprising:
   acquiring by a debt recovery service, using the computer, a portfolio of delinquent accounts;
   notifying, using the computer, one or more customers corresponding to the portfolio of delinquent accounts to contact the debt recovery service;
   retrieving, using the computer, delinquent account information corresponding to a notified customer, the delinquent account information being for a delinquent account from the portfolio having a balance;
   determining, using the computer, a set of debt recovery offers for the notified customer based on the delinquent account information, the set of debt recovery offers including at least one debt recovery credit card product;

ranking, using the computer, the debt recovery offers of the set of debt recovery offers when there is more than one debt recovery offer in the set;

receiving, using the computer, customer selection information from the notified customer, the customer selection information customizing a debt recovery product corresponding to one of the set of debt recovery offers; and creating, using the computer, a debt recovery account for the customized debt recovery product, wherein when the debt recovery product is the debt recovery credit card product, the debt recovery account is a credit card account with an initial balance based on the balance for the delinquent account corresponding to the notified customer.

* * * * *